United States Patent
Ono et al.

(10) Patent No.: US 11,110,565 B2
(45) Date of Patent: Sep. 7, 2021

(54) POLISHING APPARATUS, POLISHING METHOD, AND POLISHING CONTROL APPARATUS

(71) Applicant: TOSHIBA MEMORY CORPORATION, Tokyo (JP)

(72) Inventors: Syunichi Ono, Kuwana Mie (JP); Tsutomu Miki, Yokkaichi Mie (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 606 days.

(21) Appl. No.: 15/909,634

(22) Filed: Mar. 1, 2018

(65) Prior Publication Data

US 2019/0076985 A1    Mar. 14, 2019

(30) Foreign Application Priority Data

Sep. 8, 2017    (JP) .............................. JP2017-173298

(51) Int. Cl.
| | | |
|---|---|---|
| *B24B 49/04* | (2006.01) | |
| *B24B 49/10* | (2006.01) | |
| *B24B 37/013* | (2012.01) | |
| *G01B 17/08* | (2006.01) | |
| *B24B 49/00* | (2012.01) | |
| *B24B 49/16* | (2006.01) | |
| *B24B 53/017* | (2012.01) | |
| *B24B 37/04* | (2012.01) | |

(52) U.S. Cl.
CPC .......... *B24B 49/003* (2013.01); *B24B 37/013* (2013.01); *B24B 37/042* (2013.01); *B24B 49/04* (2013.01); *B24B 49/10* (2013.01); *B24B 49/16* (2013.01); *B24B 53/017* (2013.01); *G01B 17/08* (2013.01)

(58) Field of Classification Search
CPC ................ B24B 37/013; B24B 37/042; B24B 49/003; B24B 49/04; B24B 49/10; B24B 49/16; G01B 17/08
USPC ...................... 451/5, 6, 10, 11, 41, 285, 287
See application file for complete search history.

(56) References Cited

U.S. PATENT DOCUMENTS

| | | | | |
|---|---|---|---|---|
| 5,245,794 A | * | 9/1993 | Salugsugan ........... | B24B 49/003 451/10 |
| 5,439,551 A | * | 8/1995 | Meikle .................. | B24B 37/013 216/84 |
| 6,051,500 A | | 4/2000 | Maury et al. | |

(Continued)

FOREIGN PATENT DOCUMENTS

| JP | H09-150367 A | 6/1997 |
|---|---|---|
| JP | H11-354477 A | 12/1999 |

*Primary Examiner* — Eileen P Morgan
(74) *Attorney, Agent, or Firm* — Foley & Lardner LLP (57) ABSTRACT

A polishing apparatus includes an acoustic sensor, a sound collector, an analyzer, a feature quantity calculator, and an end point calculator. The acoustic sensor detects the polishing sound of an object. The sound collector collects a polishing sound detected by the acoustic sensor. The analyzer performs frequency analysis on the power spectrum of the polishing sound with a predetermined time resolution. The feature quantity calculator calculates an arithmetic value of the power spectra having a preset time difference of the power spectra as a polishing feature quantity by using the analysis data provided by the analysis performed by the analyzer. The end point calculator determines a polishing end point of the object based on the change in the feature quantity.

14 Claims, 11 Drawing Sheets

(56) References Cited

U.S. PATENT DOCUMENTS

| | | | |
|---|---|---|---|
| 6,709,314 B2* | 3/2004 | Kaushal | B24B 37/013 451/10 |
| 6,910,942 B1* | 6/2005 | Dornfeld | B24B 37/013 451/285 |
| 8,352,061 B2 | 1/2013 | Benvegnu et al. | |
| 8,900,033 B2* | 12/2014 | Takaishi | H01L 21/02024 451/5 |
| 9,878,421 B2* | 1/2018 | Yavelberg | B24B 37/005 |
| 10,478,937 B2* | 11/2019 | Tang | B24B 49/003 |
| 10,553,507 B2* | 2/2020 | Ono | H01L 22/26 |
| 2002/0023715 A1* | 2/2002 | Kimura | B24B 37/042 156/345.12 |
| 2003/0008597 A1* | 1/2003 | Tseng | B24B 49/003 451/6 |
| 2003/0049993 A1* | 3/2003 | Fujii | B24B 49/10 451/8 |
| 2003/0082844 A1* | 5/2003 | Crevasse | H01L 21/67253 438/80 |
| 2003/0087586 A1* | 5/2003 | Kaushal | B24B 49/10 451/8 |
| 2007/0218806 A1* | 9/2007 | Kistler | B24B 37/013 451/5 |
| 2015/0360343 A1* | 12/2015 | Yavelberg | B24B 37/005 438/5 |
| 2016/0256978 A1* | 9/2016 | Tang | B24B 49/003 |
| 2017/0263512 A1* | 9/2017 | Ono | H01L 22/12 |

\* cited by examiner

| UNIT TIME | FREQUENCY | | | |
|---|---|---|---|---|
| | f1 | f2 | f3 | ... |
| $t_{10}$ | $P_{110}$ | $P_{210}$ | $P_{310}$ | ... |
| $t_{11}$ | $P_{111}$ | | $P_{311}$ | ... |
| ⋮ | ⋮ | ⋮ | ⋮ | ... |
| $t_{20}$ | $P_{120}$ | $P_{220}$ | $P_{320}$ | ... |
| $t_{21}$ | $P_{121}$ | $P_{221}$ | $P_{321}$ | ... |
| ⋮ | ⋮ | ⋮ | ⋮ | ... |
| $t_{30}$ | $P_{130}$ | $P_{230}$ | $P_{330}$ | ... |
| $t_{31}$ | $P_{131}$ | $P_{231}$ | $P_{331}$ | ... |
| ⋮ | ⋮ | ⋮ | ⋮ | ... |

| UNIT TIME | MIXED FREQUENCY ||||
|---|---|---|---|---|
| | F1=f1×f1 | F2=f1×f2 | F3=f1×f3 | ... |
| $t_{10}$ | - | ~ | - | ~ |
| ⋮ | - | ~ | - | ~ |
| $t_{20}$ | P110×P120 | P110×P220 | P110×P320 | ... |
| $t_{21}$ | P111×P121 | P111×P221 | P111×P321 | ... |
| ⋮ | ⋮ | ⋮ | ⋮ | ... |
| $t_{30}$ | P120×P130 | P120×P230 | P120×P330 | ... |
| $t_{31}$ | P121×P131 | P121×P231 | P121×P331 | ... |
| ⋮ | ⋮ | ⋮ | ⋮ | ... |

POLISHING APPARATUS, POLISHING METHOD, AND POLISHING CONTROL APPARATUS

CROSS-REFERENCE TO RELATED APPLICATION

This application claims the benefit of and priority to Japanese Patent Application No. 2017-173298, filed Sep. 8, 2017, the entire contents of which are incorporated herein by reference.

FIELD

Embodiments described herein relate generally to a polishing apparatus, a polishing method, and a polishing control apparatus.

BACKGROUND

A method of detecting a polishing end point by collecting a polishing sound of an object to be polished has been known. This method calculates the power spectrum of the polishing sound as a feature quantity reflecting a polishing situation, and determines the polishing end point based on a change in this power spectrum.

However, one problem is that the change in the power spectrum of the polishing sound may be affected by the condition of a polishing component of the machine. For example, when polishing an object with a polishing pad immediately after the pad is replaced, a polishing rate is lower than before the replacement. As a result, since the change in the power spectrum of the polishing sound at the polishing end point becomes small, the detection sensitivity of the polishing end point is likely to decrease.

DETAILED DESCRIPTION

Embodiments provide a polishing apparatus, a polishing method, and a polishing control apparatus that are capable of improving detection sensitivity of a polishing end point.

In general, according to some embodiments, the polishing apparatus includes an acoustic sensor, a sound collection unit, an analysis unit, a feature quantity calculation unit, and an end point determination unit. The acoustic sensor detects the polishing sound of an object to be polished. The sound collection unit collects a polishing sound from the acoustic sensor. The analysis unit performs frequency analysis on the power spectrum of the polishing sound with a predetermined time resolution. The feature quantity calculation unit calculates an arithmetic value of the power spectra having a preset time difference therebetween as a polishing feature quantity by using the analysis data, which shows the analysis result of the analysis unit. The endpoint determination unit determines a polishing end point of the object to be polished based on the change in the feature quantity.

Hereinafter, embodiments of the present disclosure will be described with reference to drawings. The present embodiment does not limit the present invention.

Figure 1:
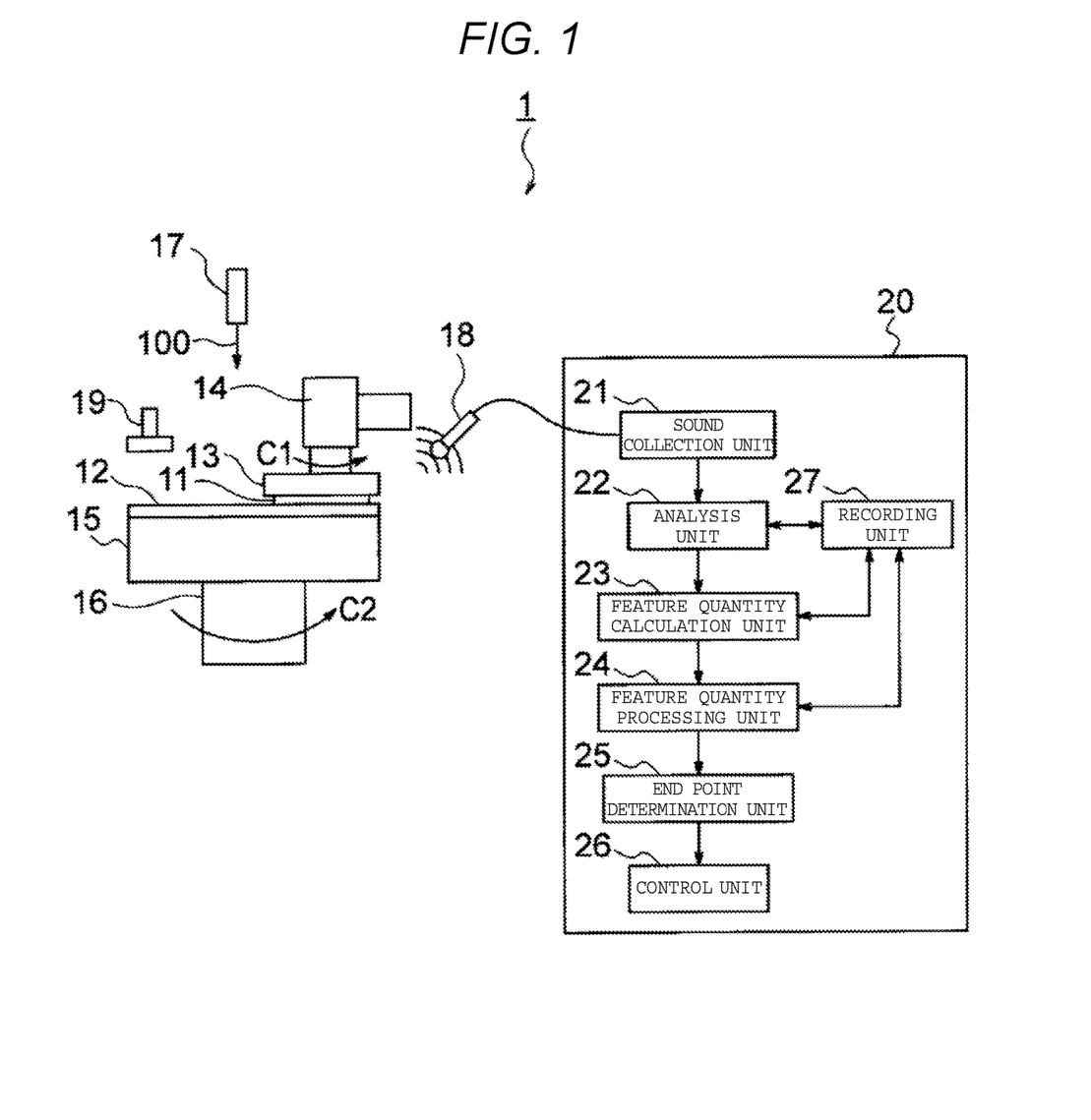
FIG. 1 is a diagram schematically showing a configuration of a polishing apparatus according to some embodiments.

FIG. 1 is a diagram schematically showing a configuration of a polishing apparatus according to some embodiments. A polishing apparatus 1 shown in FIG. 1 is a chemical mechanical polishing (CMP) apparatus which chemically mechanically polishes an object 11 to be polished. In some embodiments, the object 11 to be polished is a wafer-shaped semiconductor substrate.

The polishing apparatus 1 includes a polishing pad 12, a polishing head 13, a driving unit 14, a polishing table 15, a rotating unit (rotator) 16, a slurry supplying unit 17, an acoustic sensor 18, a dresser 19, and a polishing control apparatus 20. The polishing control apparatus 20 may be provided as part of the polishing apparatus 1 or may have a configuration separated or independent from the polishing apparatus 1.

The polishing pad 12 is replaceably held on the polishing table 15. The polishing pad 12 is made from polyurethane, for example. The polishing head 13 holds the object 11 to be polished downward. The driving unit 14 is connected to the polishing head 13 and drives the polishing head 13. The rotating unit 16 is connected to and rotates the polishing table 15. The slurry supplying unit 17 supplies slurry 100 to the surface of the polishing pad 12. The dresser 19 grinds the surface of the polishing pad 12 after polishing of the object 11 is finished.

In the polishing apparatus 1, the driving unit 14 rotates the object 11, the rotating unit 16 rotates the polishing pad 12, and the slurry 100 is supplied from the slurry supplying unit 17 to the surface of the polishing pad 12. An arrow C1 indicates the rotating direction of the object 11 to be polished or the polishing head 13. An arrow C2 indicates the rotating direction of the polishing pad 12 and the polishing table 15. Then, in the polishing apparatus 1, the object 11 to be polished is pressed against the polishing pad 12 by the driving unit 14. As a result, the surface of the object 11 to be polished is polished by the polishing pad 12. The operations of the polishing head 13, the driving unit 14, the polishing table 15, the rotating unit 16, and the slurry supplying unit 17 are controlled by the polishing control apparatus 20. The polishing control apparatus may be a known controller structure, such as a microprocessor or a computer having a central processing unit.

The acoustic sensor 18 collects the polishing sound generated during polishing of the object 11 to be polished and outputs a sound collection result of the polishing sound to the polishing control apparatus 20. The acoustic sensor 18 is, for example, a microphone. The operation of the acoustic sensor 18 is also controlled by the polishing control apparatus 20.

Figure 2A:
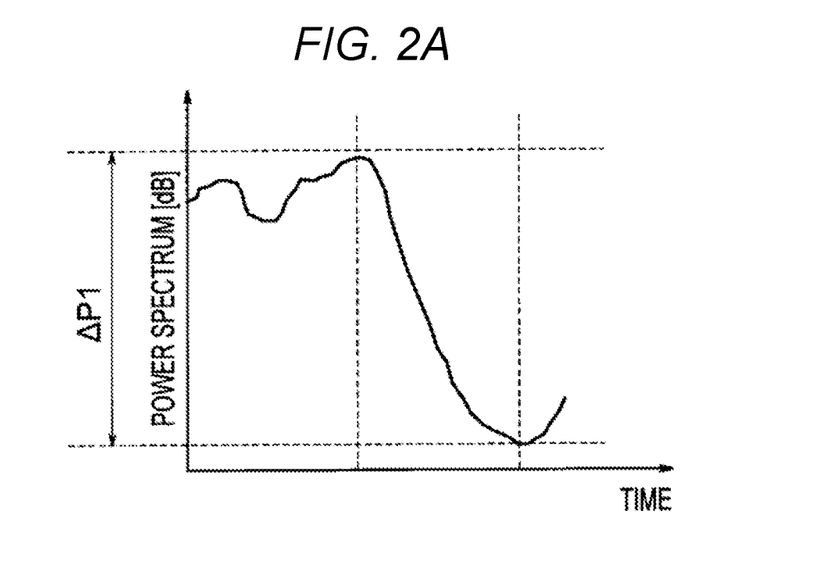
FIG. 2A is a graph showing a change in a power spectrum of a polishing sound before replacement of a polishing component.
Figure 2B:
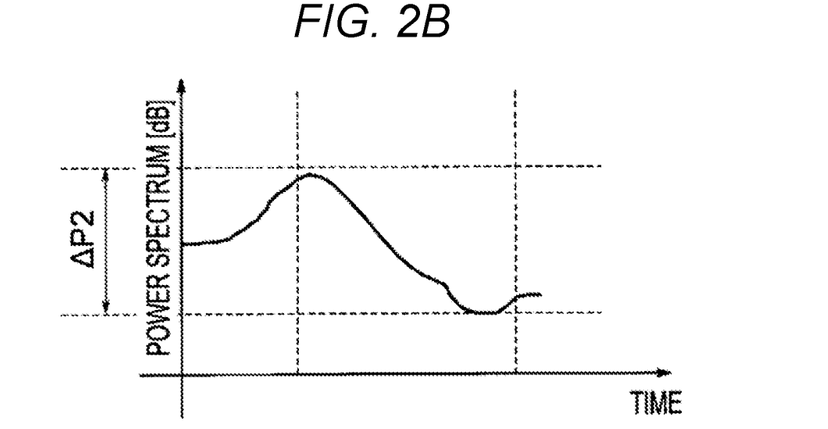
FIG. 2B is a graph showing a change in the power spectrum of the polishing sound immediately after replacement of the polishing component.

FIG. 2A is a graph showing a change in a power spectrum of a polishing sound before replacement of a polishing component. FIG. 2B is a graph showing the power spectrum change of the polishing sound immediately after the replacement of the polishing component. For the polishing component, for example, the polishing pad 12 or the dresser 19 is applicable. The scales of the vertical axis and the horizontal axis in FIG. 2A are equal to the scales of the vertical axis and the horizontal axis in FIG. 2B.

In the object 11 to be polished, for example, it is assumed for the sake of illustration that a wiring pattern is formed on a silicon substrate and an insulating film such as a silicon oxide film is formed on the wiring pattern. As this insulating film is polished with polishing pad 12, the wiring pattern starts to be exposed. At this time, as shown in FIG. 2A, before the polishing pad 12 is replaced, the detection sensitivity of the polishing end point is high because a power spectrum change amount $\Delta P1$ at the polishing end point is large. On the other hand, after replacing the polishing pad 12 or the dresser 19, as shown in FIG. 2B, the detection sensitivity of the polishing end point decreases because a power spectrum change amount $\Delta P2$ is small especially immediately after the replacement.

Therefore, in some embodiments, the polishing control apparatus 20 for improving the detection sensitivity of the polishing end point is provided. As shown in FIG. 1, the polishing control apparatus 20 includes a sound collection unit 21 (sound collector), an analysis unit 22 (analyzer), a feature quantity calculation unit 23 (feature quantity calculator), a feature quantity processing unit 24 (feature quantity processor), an end point determination unit 25 (end point calculator), a control unit 26 (controller 26), and a recording unit 27 (recorder). Hereinafter, the functions and operations of the respective units will be described with reference to the flowchart shown in FIG. 3.

Figure 3:
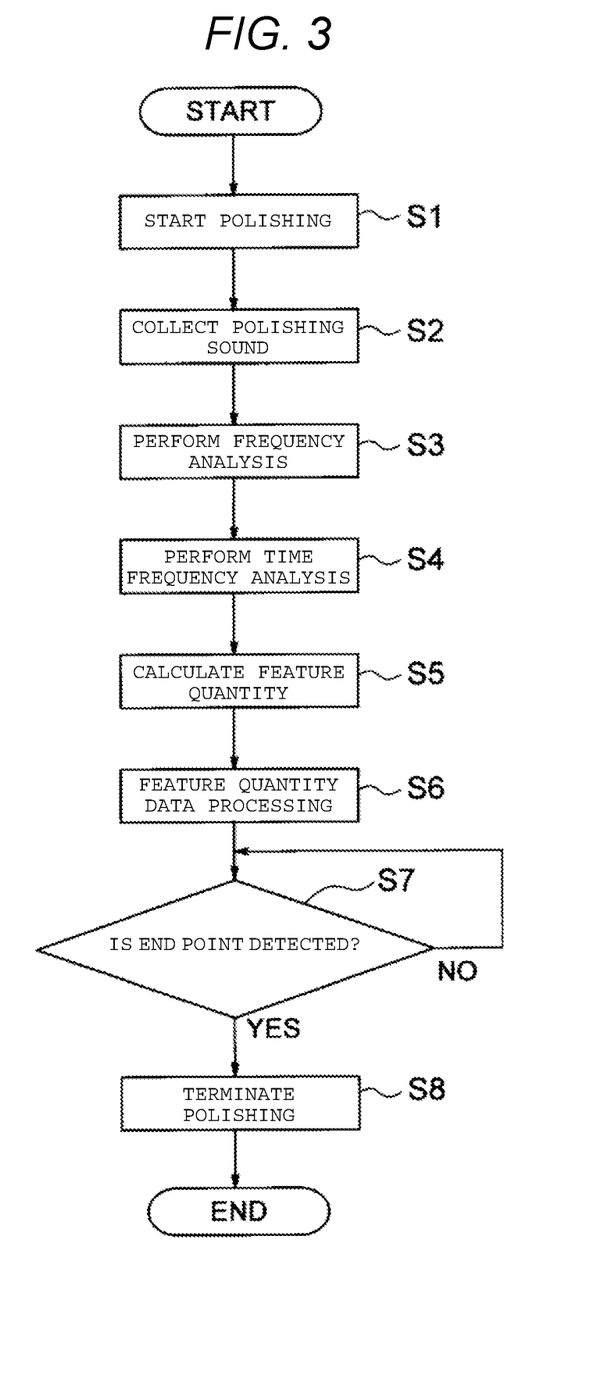
FIG. 3 is a flowchart showing a polishing end point detection method according to some embodiments.

FIG. 3 is a flowchart showing a polishing end point detection method according to some embodiments. First, the control unit 26 starts polishing the object 11 (step S1). Subsequently, the sound collection unit 21 collects a polishing sound of the object 11 detected by the acoustic sensor 18 (step S2).

Figure 4:
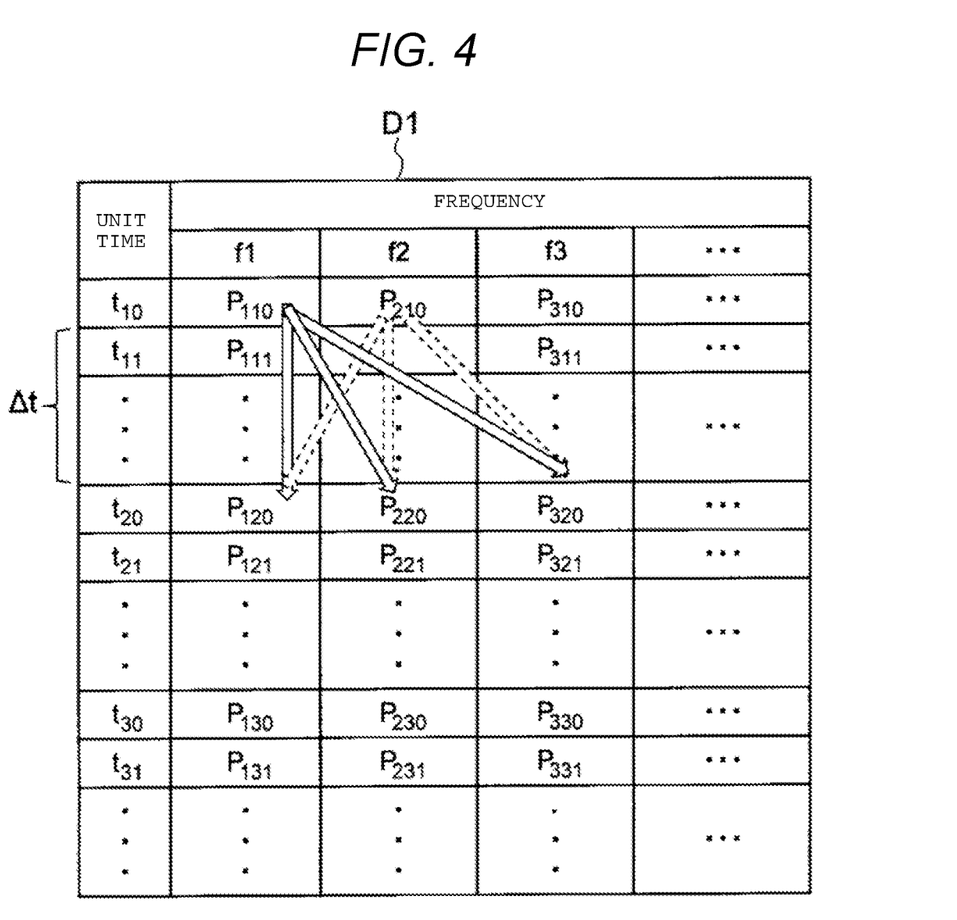
FIG. 4 is a diagram showing an example of analysis data.

Next, the analysis unit 22 performs frequency analysis and time frequency analysis on the collected polishing sound (steps S3 and S4). In the present embodiment, the analysis unit 22 performs frequency analysis on the power spectrum of the polishing sound with a predetermined time resolution by fast Fourier transform (FFT). As a result, analysis data D1 shown in FIG. 4 is recorded in the recording unit 27. The analysis data D1 shows a power spectrum P of the polishing sound correlated to a unit time t and a frequency f, respectively. This unit time t is an interval of time analysis of frequency analysis.

Next, the feature quantity calculation unit 23 calculates an arithmetic value of the power spectra of the polishing sound having a preset time difference $\Delta t$ of the power spectra by using the analysis data D1 as the polishing feature quantity (step S5). Here, step S5 from the flowchart shown in FIG. 3 is described in detail.

Figure 5:
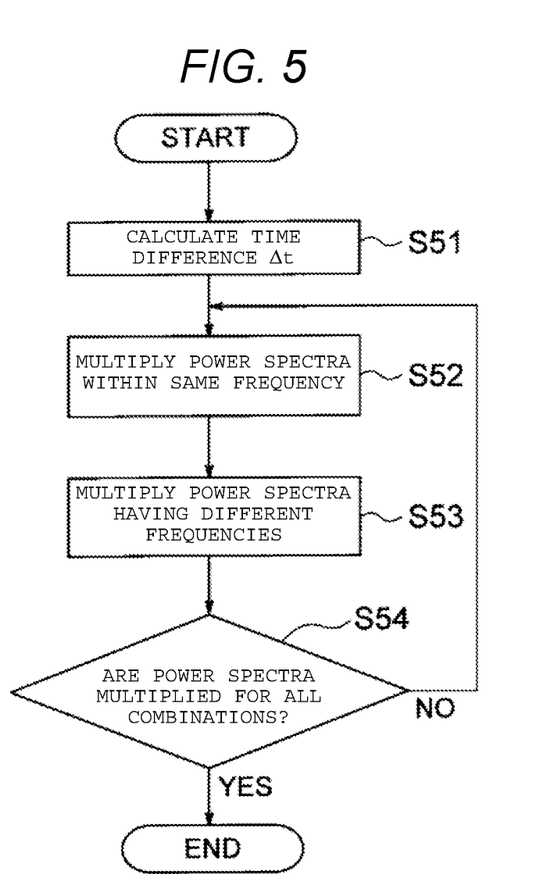
FIG. 5 is a flowchart showing a feature quantity calculation method.

FIG. 5 is a flowchart showing a feature quantity calculation method. As shown in FIG. 5, first, the feature quantity calculation unit 23 calculates the time difference $\Delta t$ (step S51). Here, a method of calculating the time difference $\Delta t$ will be described with reference to FIGS. 6A and 6B.

Figure 6A:
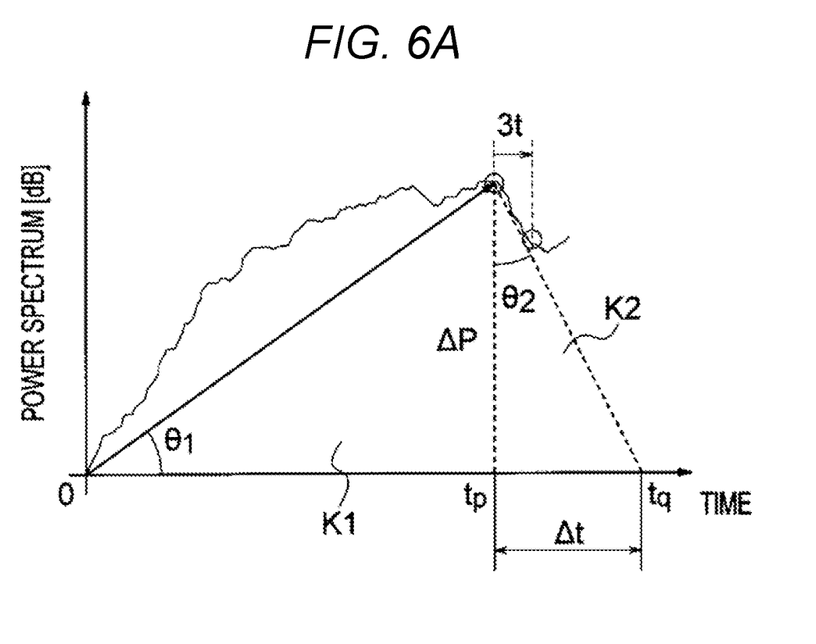
FIG. 6A is a diagram showing a change in the power spectrum of the polishing sound with a fast polishing rate.
Figure 6B:
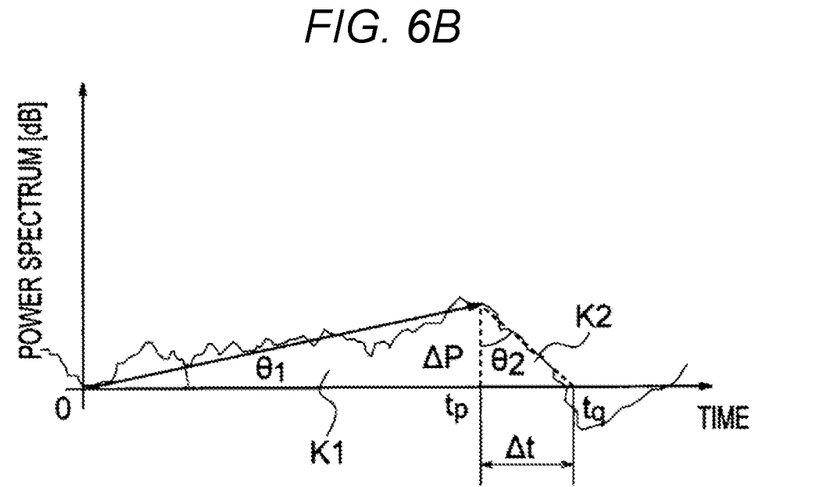
FIG. 6B is a diagram showing a change in the power spectrum of the polishing sound with a slow polishing rate.

FIG. 6A is a diagram showing a change in the power spectrum of the polishing sound with a fast polishing rate, and FIG. 6B is a diagram showing a change in the power spectrum of the polishing sound with a slow polishing rate. Data indicating the power spectra of the polishing sound shown in FIGS. 6A and 6B is recorded in the recording unit 27 in advance as master information. As master information, for example, data of the object 11 to be polished in the past may be used. The scales of the vertical axis and the horizontal axis in FIG. 6A and FIG. 6B are equal to each other.

In order to calculate the time difference $\Delta t$, the feature quantity calculation unit 23 first calculates the time from a power spectrum increase start time point (origin 0) to the power spectrum decrease start time point $t_p$, that is, the increase time of the power spectrum.

Next, the feature quantity calculation unit 23 specifies an intersection point $t_q$ where a straight line passing through the decrease start time point $t_p$ and an elapsed point after a predetermined time has elapsed from the decrease start time point $t_p$ crosses the time axis. In the present embodiment, the predetermined time is set to three unit time (3t), but the predetermined time is not limited to three unit time.

Next, the feature quantity calculation unit 23 forms a first right triangle K1 and a second right triangle K2 in virtual two-dimensional coordinates to calculate the time difference $\Delta t$. The first right triangle K1 is a right-angled triangle with the origin 0, the decrease start time point $t_p$, and a peak point of the power spectrum at the decrease start time point $t_p$ as apexes. On the other hand, the second right triangle K2 is a right-angled triangle with the decrease start time point $t_p$, a peak point, and an intersection point $t_q$ as apexes. The feature quantity calculation unit 23 calculates an angle $\theta_1$ indicating a degree of increase in the power spectrum and an angle $\theta_2$ indicating a degree of decrease in the power spectrum, and then calculates the time difference $\Delta t$ by using these calculated angles or Pythagorean theorem.

The time difference $\Delta t$ calculated as described above corresponds to the decrease time of the power spectrum. The decrease time of the power spectrum changes according to the polishing rate. Therefore, the feature quantity calculation unit 23 selects optimum master information according to the polishing environment and calculates the time difference $\Delta t$. For example, in a case where the object 11 to be polished is polished immediately after replacement of the polishing pad 12, the feature quantity calculation unit 23 calculates the time difference $\Delta t$ based on the data of the power spectrum shown in FIG. 6B.

When the time difference $\Delta t$ is calculated as described above, the feature quantity calculation unit 23 uses the analysis data D1 to multiply the power spectra P having the time difference $\Delta t$ therebetween within the same frequency by each other (step S52). For example, the feature quantity calculation unit 23 multiplies a power spectrum $P_{110}$ at a time $t_{10}$ at a frequency f1 of the analysis data D1 by a power spectrum $P_{120}$ at a time $t_{20}$. This resultant product corresponds to an auto-correlation. The auto-correlation is a measure indicating the consistency between one signal and another signal whose time is shifted by one signal.

Next, by using the analysis data D1, the feature quantity calculation unit 23 multiplies the power spectra P, at different frequencies, having the time difference $\Delta t$ therebetween (step S53) by each other. For example, the feature quantity calculation unit 23 multiplies the power spectrum $P_{110}$ at the time $t_{10}$ at the frequency f1 and a power spectrum $P_{220}$ at the time $t_{20}$ at a frequency f2 by each other.

Figure 7:
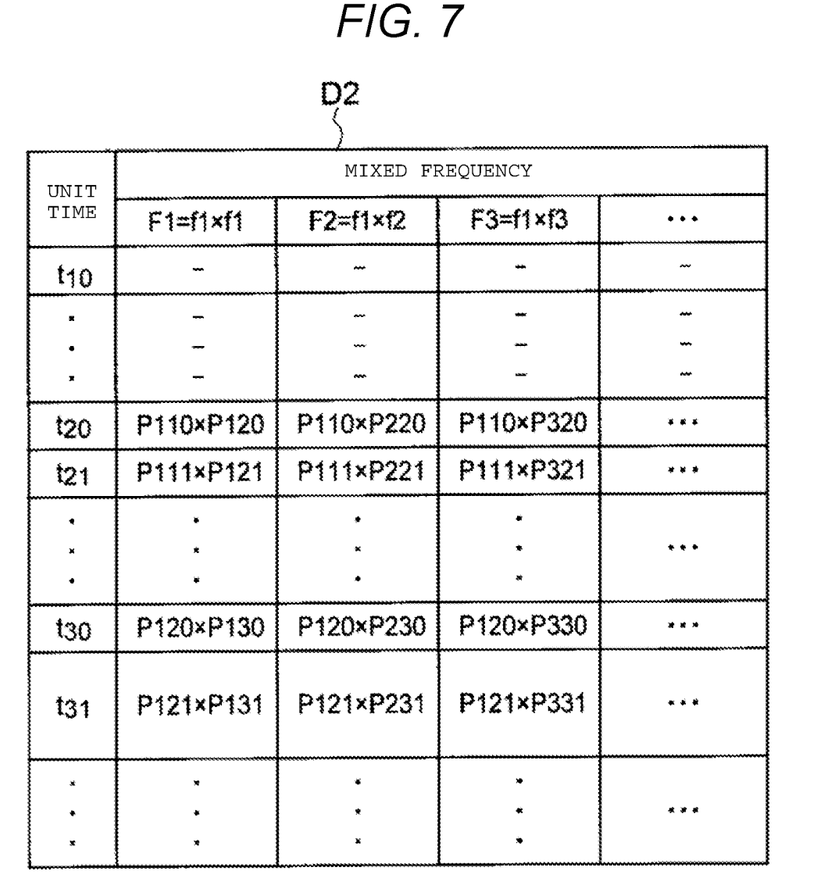
FIG. 7 is a diagram showing an example of feature quantity data.

The feature quantity calculation unit 23 repeats the operations of steps S52 and S53 until the products of the power spectra are calculated for all combinations having the time difference $\Delta t$ (step S54). As a result, the feature quantity data D2 shown in FIG. 7 is recorded in the recording unit 27. The feature quantity data D2 shows the power spectrum of the polishing sound in correlation with a unit time and a mixed frequency F, respectively.

Next, the feature quantity processing unit 24 processes the feature quantity data D2 (step S6). Here, step S6 is extracted from the flowchart shown in FIG. 3 and described in detail.

Figure 8:
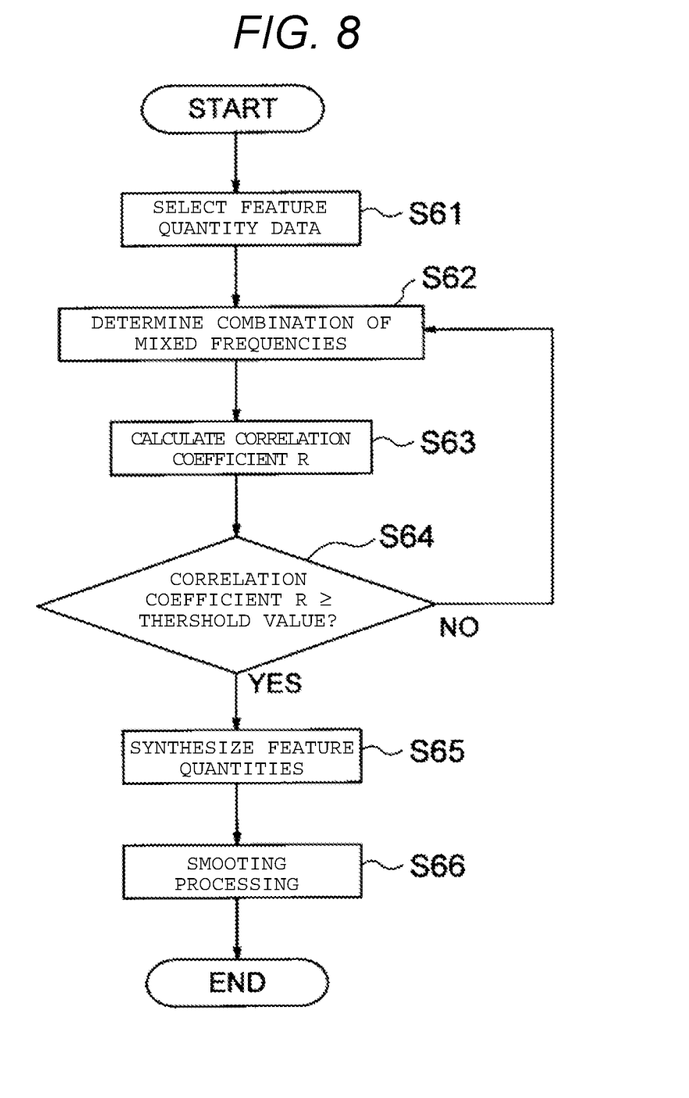
FIG. 8 is a flowchart showing feature quantity data processing.

FIG. 8 is a flowchart showing feature quantity data processing. First, the feature quantity processing unit 24 selects a mixed frequency whose feature quantity is changing from increasing to decreasing from the feature quantity data D2 (step S61).

Figure 9:
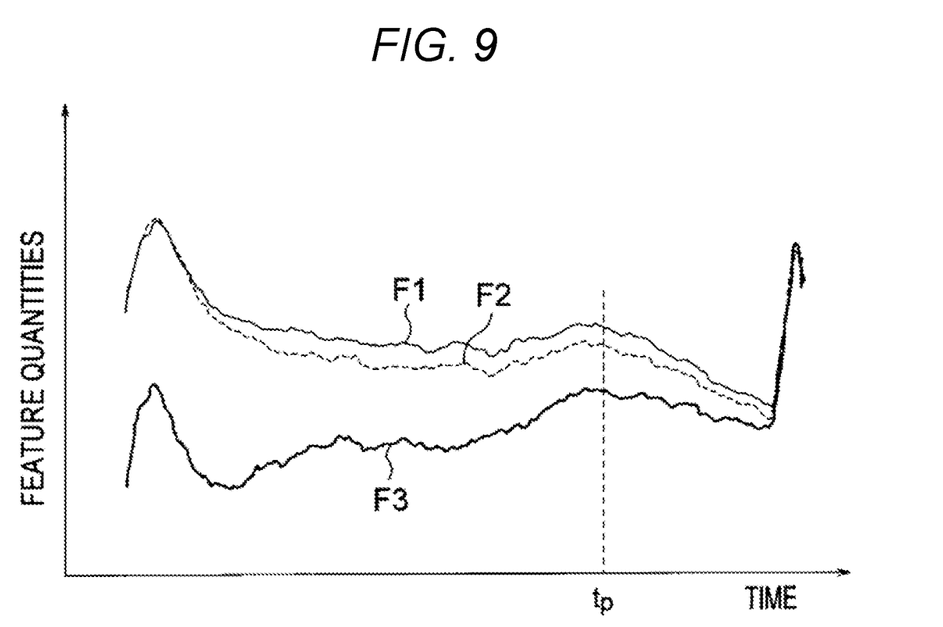
FIG. 9 is a diagram showing a change in a feature quantity having a decrease start time point $t_p$.

In step S61, the feature quantity processing unit 24 calculates an angle indicating a degree of the change in the feature quantity, for example, similarly to the calculation of the time difference $\Delta t$. When the feature quantity changes from increasing to decreasing, this angle also changes. According to step S61, since the feature quantity processing unit 24 selects a mixed frequency whose feature quantity (feature quantities) has the decrease start time point $t_p$ as shown in FIG. 9, a mixed frequency whose feature quantity is constant is excluded. Such feature quantity is not suitable for endpoint detection of polishing. Therefore, unnecessary data for end point detection may be excluded from the feature quantity data D2.

Next, the feature quantity processing unit 24 determines the combination of the mixed frequencies selected in step S61 (step S62). Next, the feature quantity processing unit 24 calculates a correlation coefficient R of the feature quantity for all combinations of two mixed frequencies (step S63). The correlation coefficient R may be calculated by dividing the covariance by the product of the standard deviation of each feature quantity at the two mixing frequencies.

Next, the feature quantity processing unit 24 compares the correlation coefficient R with a threshold value (step S64). In the present embodiment, the threshold value is set to 0.5, but the threshold value is not limited to 0.5.

Figure 10A:
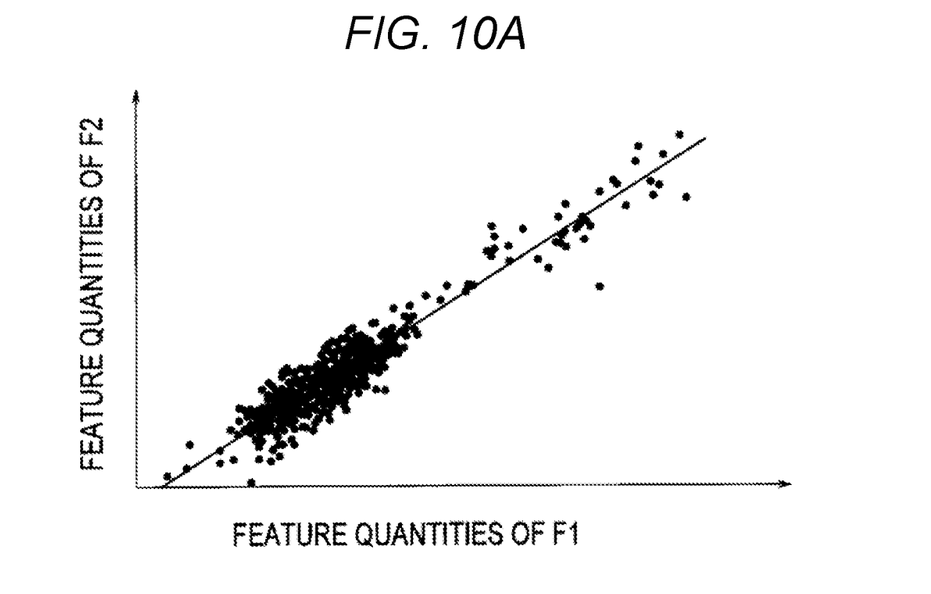
FIG. 10A is a diagram showing that a correlation of the feature quantities is high.
Figure 10B:
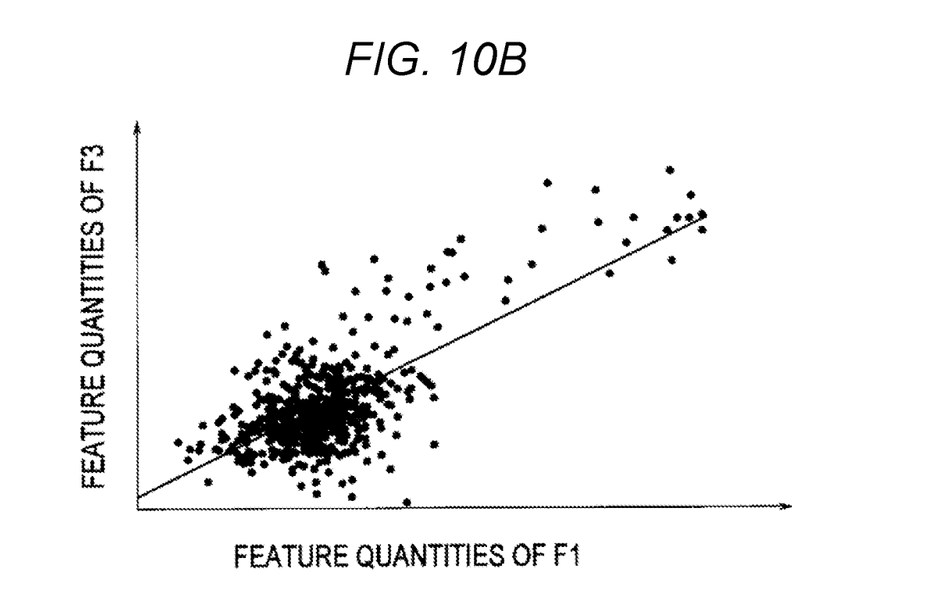
FIG. 10B is a diagram showing that the correlation with the feature quantities is low.

FIG. 10A is a diagram showing the correlation between the feature quantities of a mixed frequency F1 and the feature quantities of a mixed frequency F2. FIG. 10B is a diagram showing the correlation between the feature quantities of the mixed frequency F1 and the feature quantities of a mixed frequency F3. The waveforms of the feature quantities of the mixed frequencies F1 to F3 are shown in FIG. 9. The scales of the vertical axis and the horizontal axis in FIG. 10A and FIG. 10B are equal to each other.

As shown in FIG. 9, the changes in the feature quantities between the mixed frequency F1 and the mixed frequency F2 are similar. Therefore, as shown in FIG. 10A, the correlation coefficient R becomes equal to or larger than the threshold value. On the other hand, the changes in the feature quantities between the mixed frequency F1 and the mixed frequency F3 are different. Therefore, as shown in FIG. 10B, the correlation coefficient R becomes smaller than the threshold value.

If the correlation coefficient R is equal to or larger than the threshold value, the feature quantity processing unit 24 synthesizes the feature quantities (step S65). As a result, a power spectrum suitable for detecting the polishing end point is generated.

Next, the feature quantity processing unit 24 performs smoothing processing in order to make the waveform of the power spectrum a waveform that is smooth and easy to detect (step S66). In step S66, the feature quantity processing unit 24 performs simple movement average processing on the power spectrum, for example.

When the smoothing processing by the feature quantity processing unit 24 is terminated, as shown in FIG. 3, the end point determination unit 25 determines a polishing end point by detecting the change in the power spectrum in the smoothed power spectrum (step S7). When the end point determination unit 25 detects a polishing end point, the control unit 26 terminates the polishing of the object 11 to be polished (step S8). Specifically, the control unit 26 stops the rotation of the rotating unit 16 and the driving unit 14.

Figure 11A:
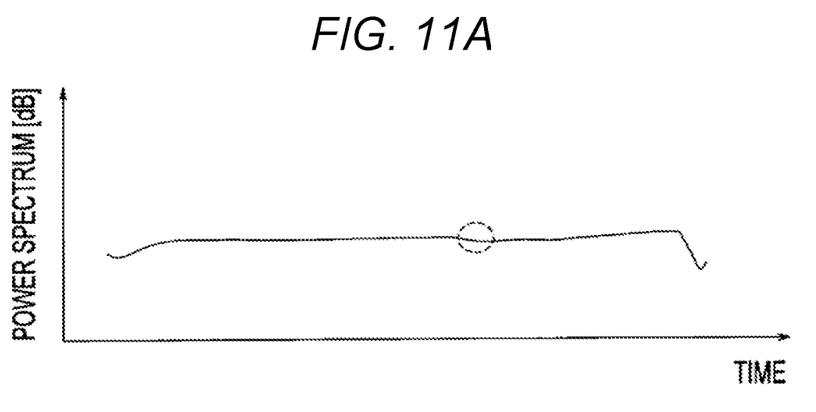
FIG. 11A is a diagram showing the power spectrum of the polishing sound used in the end point detection method of a comparative example.
Figure 11B:
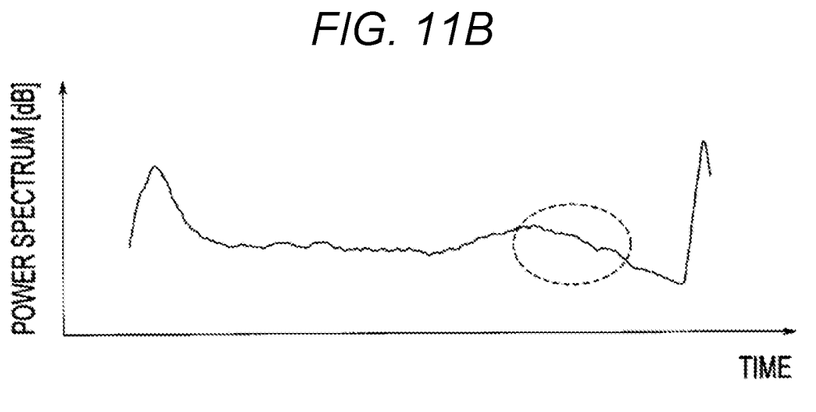
FIG. 11B is a diagram showing the power spectrum of the polishing sound used in the endpoint detection method according to some embodiments.

FIG. 11A is a diagram showing the power spectrum of the polishing sound used in the end point detection method of a comparative example. FIG. 11B is a diagram showing the power spectrum of the polishing sound used in the end point detection method of the present embodiment. The scales of the vertical axis and the horizontal axis in FIG. 11A and FIG. 11B are equal to each other.

In the end point detection method of the comparative example, only the analysis data D1 is used to generate a power spectrum of the polishing sound. Therefore, when the polishing environment changes, there is a high possibility that the power spectrum change amount at the polishing end point becomes small as shown by the dotted line area in FIG. 11A.

On the other hand, according to the present embodiment described above, the arithmetic value of the power spectra having the time difference $\Delta t$ therebetween is calculated as anew feature quantity by using the analysis data D1. The new feature quantity is normalized so as to make it easier to detect a polishing end point. Therefore, as shown by the dotted line area in FIG. 11B, since the power spectrum change amount at the polishing end point increases, the detection sensitivity of the polishing end point may be improved.

The polishing apparatus or the polishing control apparatus may further include a recording unit that records analysis data and feature quantity data indicating the calculation result of the feature quantity calculation unit.

In addition, in the polishing apparatus or the polishing control apparatus, the feature quantity calculation unit may calculate a time difference based on the decrease time of the power spectrum of the object to be polished in the past.

Further, in the polishing apparatus or the polishing control apparatus, the recording unit may record power spectra having different polishing rates as master information in advance, and the feature quantity calculation unit may select master information according to the polishing environment to calculate the time difference.

Further, in the polishing apparatus or the polishing control apparatus, the feature quantity processing unit may perform smoothing processing on the synthesized feature quantity.

While certain embodiments have been described, these embodiments have been presented byway of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A polishing apparatus comprising:
an acoustic sensor configured to detect a polishing sound of an object to be polished;
a sound collector configured to collect the polishing sound detected by the acoustic sensor;
an analyzer configured to perform frequency analysis on power spectra of the polishing sound with a given time resolution to acquire first data, the first data represented by a first table in which each power spectrum of the power spectra is correlated with a time point and a frequency;
a calculator configured to:
perform an arithmetic operation between a first part of the power spectra in the first data that is correlated with a first time point and a second part of the power spectra in the first data that is correlated with a second time point to acquire second data, the second data represented by a second table in which each of a plurality of arithmetic values is correlated with the time point and a mixed frequency;
analyze each of parts of the arithmetic values in the second data that is correlated with a corresponding mixed frequency to determine whether or not the part of the arithmetic values of the second data satisfies a changes in value;
synthesize two of the parts of the arithmetic values of the second data with value changes when a correlation coefficient between the two of the parts of the arithmetic values of the second data with value changes falls under a threshold value to obtain synthesized values; and
an end point calculator configured to determine a polishing end point of the object based on a change in the synthesized values.

2. The polishing apparatus according to claim 1, wherein the calculator is configured to set the first time point and the second time point to have a time difference based on polishing environment information relating to a polishing environment of the object.

3. The polishing apparatus according to claim 2, wherein the polishing environment information includes replacement timing of a polishing component.

4. The polishing apparatus according to claim 1, wherein the calculator is configured to calculate a product of the power spectra of different frequencies.

5. The polishing apparatus according to claim 1, wherein the time difference is set based on a decrease time of the power spectrum.

6. The polishing apparatus according to claim 1, wherein the calculator is configured to calculate the correlation coefficient if the second data changes from increasing to decreasing.

7. A polishing method comprising:
detecting a polishing sound of an object to be polished;
collecting the polishing sound;
performing frequency analysis on a power spectra of the collected polishing sound with a given time resolution to acquire first data, the first data represented by a first table in which each power spectrum of the power spectra is correlated with a time point and a frequency;
performing an arithmetic operation between a first part of the power spectra in the first data that is correlated with a first time point and a second part of the power spectra in the first data that is correlated with a second time point to acquire second data, the second data represented by a second table in which each of a plurality of arithmetic values is correlated with the time point and a mixed frequency;
analyzing each of parts of the arithmetic values in the second data that is correlated with a corresponding mixed frequency to determine whether or not the part of the arithmetic values of the second data satisfies changes in value;
synthesizing two of the parts of the arithmetic values of the second data with value changes when a correlation coefficient between the two of the parts of the arithmetic values of the second data with value changes falls under a threshold value to obtain synthesized values; and
determining a polishing end point of the object based on a change in the synthesized values.

8. The method according to claim 7,
further comprising setting the first time point and the second time point to have a time difference based on polishing environment information indicative of a polishing environment of the object.

9. The method according to claim 7,
wherein the time difference is set based on a decrease time of the power spectrum.

10. The method according to claim 7,
wherein the correlation coefficient is calculated in a case where the second data changes from increasing to decreasing.

11. A polishing control apparatus comprising:
a processor and a memory storing data, the processor configured to:
collect a polishing sound of an object to be polished;
perform frequency analysis on the power spectra of the polishing sound with a given time resolution to acquire first data, the first data represented by a first table in which each power spectrum of the power spectra is correlated with a time point and a frequency;
perform an arithmetic operation between a first part of the power spectra in the first data that is correlated with a first time point and a second part of the power spectra in the first data that is correlated with a second time point to acquire second data, the second data represented by a second table in which each of a plurality of arithmetic values is correlated with the time point and a mixed frequency;
analyze each of parts of the arithmetic values in the second data that is correlated with a corresponding mixed frequency to determine whether or not the part of the arithmetic values of the second data satisfies changes in value;
synthesize two of the parts of the arithmetic values of the second data with value changes when a correlation coefficient between the two of the parts of the arithmetic values of the second data with value changes falls under a threshold value to obtain synthesized values; and
determine a polishing end point of the object to be polished based on a change in the synthesized values.

12. The polishing control apparatus according to claim 11, wherein the processor is configured to set the first time point and the second time point to have a time difference based on polishing environment information indicative of a polishing environment of the object to be polished.

13. The polishing control apparatus according to claim 11, wherein the time difference is set based on a decrease time of the power spectrum.

14. The polishing control apparatus according to claim 11, wherein the processor is configured to calculate the correlation coefficient in a case where the second data changes from increasing to decreasing.

* * * * *